US005762104A

United States Patent [19]

Green et al.

[11] Patent Number: 5,762,104

[45] Date of Patent: Jun. 9, 1998

[54] LIQUID PUMPING SYSTEM WITH PRESSURE RELIEF MECHANISM

[75] Inventors: Brian C. Green; Leon R. Schuster, both of Sun Prairie, Wis.

[73] Assignee: Fe Petro Inc., McFarland, Wis.

[21] Appl. No.: 541,304

[22] Filed: Oct. 10, 1995

[51] Int. Cl.[6] .......... F16K 17/168; B67D 5/04

[52] U.S. Cl. .......... 137/513.7; 137/570; 222/73

[58] Field of Search .......... 137/513.7, 570; 417/434; 222/72, 73

[56] References Cited

U.S. PATENT DOCUMENTS

| | | | |
|---|---|---|---|
| 1,028,722 | 6/1912 | Hess | 417/434 |
| 1,717,274 | 6/1929 | Stedwell | 222/73 X |
| 1,722,985 | 7/1929 | Kling | 222/73 |
| 1,987,766 | 1/1935 | Wertz | 222/72 |
| 2,054,209 | 9/1936 | Uttech | 137/570 |
| 2,084,897 | 6/1937 | Risser | 222/73 |
| 2,368,183 | 1/1945 | Volpin | 137/246.11 |
| 2,703,582 | 3/1955 | Stepanian | 137/513.7 |
| 2,732,100 | 1/1956 | Jackson et al. | 222/73 |
| 2,732,103 | 1/1956 | Wright et al. | 222/73 X |
| 2,877,979 | 3/1959 | Snyder | 137/589 X |
| 3,183,723 | 5/1965 | Deters | 222/52 X |
| 3,289,694 | 12/1966 | Frye | 137/513.7 X |
| 3,863,687 | 2/1975 | Alquist | 141/45 |
| 3,913,633 | 10/1975 | Hiller | 141/45 |
| 3,926,230 | 12/1975 | Stary et al. | 141/45 |
| 3,996,975 | 12/1976 | Hansel | 141/45 |
| 4,100,758 | 7/1978 | Mayer | 141/45 |
| 4,153,073 | 5/1979 | Deters | 141/59 X |
| 4,273,164 | 6/1981 | Gunn | 141/7 |
| 4,649,970 | 3/1987 | Bower et al. | 141/59 X |
| 4,770,677 | 9/1988 | Harris | 141/45 X |
| 4,798,223 | 1/1989 | Mitchell et al. | 137/312 |
| 4,842,027 | 6/1989 | Faeth | 141/59 X |
| 4,971,225 | 11/1990 | Bravo | 222/110 |
| 5,040,576 | 8/1991 | Faeth | 141/59 X |
| 5,040,577 | 8/1991 | Pope | 141/59 |
| 5,090,075 | 2/1992 | Larson | 5/451 |
| 5,100,024 | 3/1992 | Bravo | 220/40 |
| 5,240,045 | 8/1993 | Faeth | 141/59 X |
| 5,244,022 | 9/1993 | Gimby | 141/301 |
| 5,249,696 | 10/1993 | Bryant et al. | 220/367 |
| 5,265,652 | 11/1993 | Brunella | 141/59 |
| 5,285,829 | 2/1994 | Bravo | 141/88 |
| 5,289,857 | 3/1994 | Pyles | 141/59 |
| 5,301,721 | 4/1994 | Hartmann | 141/59 |
| 5,305,807 | 4/1994 | Healy | 141/59 |
| 5,323,817 | 6/1994 | Spalding | 141/59 X |
| 5,332,011 | 7/1994 | Spalding | 141/59 |
| 5,341,857 | 8/1994 | Bravo | 141/88 |
| 5,450,883 | 9/1995 | Payne et al. | 141/59 |
| 5,452,750 | 9/1995 | Miller et al. | 141/59 X |

FOREIGN PATENT DOCUMENTS

| | | | |
|---|---|---|---|
| 1020504 | 12/1957 | Germany | 137/513.7 |

*Primary Examiner*—John Rivell
*Attorney, Agent, or Firm*—Marshall, O'Toole, Gerstein, Murray & Borun

[57] ABSTRACT

This disclosure relates to a system for pumping a liquid from a storage tank, through a pipe and out of a valve of a liquid dispenser. The apparatus comprises a manifold housing having a main flow passage formed therein, a check valve mounted in said main flow passage and enabling liquid to flow from the storage tank to the liquid dispenser, and a manually-operated pressure relief mechanism around the check valve. The mechanism comprises a bypass flow passage formed in the housing in parallel with the check valve, and a stopper which normally closes the bypass flow passage. To relieve the liquid pressure, the stopper is manually moved to a relief position where it is removed from the bypass flow passage, thereby enabling the liquid to flow around the check valve. To resume normal operation, the stopper is returned to its normal position where it blocks the bypass flow passage. The stopper is movably mounted in a bore in the housing, and the bore extends to an opening at the exterior surface of the housing. A seal is provided between the stopper and the wall of the bore, to prevent the liquid and vapor from entering the environment.

21 Claims, 3 Drawing Sheets

LIQUID PUMPING SYSTEM WITH PRESSURE RELIEF MECHANISM

FIELD AND BACKGROUND OF THE INVENTION

This invention relates to a liquid pumping system, and more specifically to such a system including a pressure relief mechanism.

Systems for pumping a liquid are, of course, well known and are described in many patents. For example, the E. M. Deters U.S. Pat. No. 4,153,073 describes a system for pump fuel such as gasoline at a filling or service station. Such a system typically includes an underground fuel storage tank and a pump-motor unit for pumping fuel through a manifold to a hose nozzle attached to a fuel dispenser. In such a system, the nozzle includes a hand-operated valve which is opened when fuel is dispensed, and it further includes a check or one-way valve in the manifold. While fuel is being dispensed, both valves are open and the pump-motor unit pumps fuel under pressure through the valves and out of the nozzle. To terminate a fuel dispensing operation, the operator manually closes the fuel valve in the nozzle, and this action automatically turns off the pump-motor unit. The fuel in the pipes between the manifold and the nozzle is then trapped under pressure between the valve in the nozzle and the check valve in the manifold.

Normally it is advantageous to have the fuel under pressure in the pipes between the two valves because less time and energy is needed to pump fuel through the pipes in the next fuel dispensing operation. However, in some instances it is desirable to release the fuel pressure in the line. For example, if a fuel filter becomes clogged or if a dispenser part needs maintenance, it is necessary to relieve the fuel pressure before working on the parts. This could be done by turning off the pump-motor unit and then opening the valve in the nozzle, but this may result in release of dangerous fuel and fuel vapor into the environment.

It is a general object of the present invention to provide an improved pumping system including a pressure relief, which avoids the foregoing problem.

BRIEF DESCRIPTION OF THE INVENTION

Apparatus constructed in accordance with this invention is for use in a system for pumping a liquid from a storage tank, through a pipe and out of a valve of a liquid dispenser. The apparatus comprises a manifold housing having a main flow passage formed therein, a check valve mounted in said main flow passage and enabling liquid to flow from the storage tank to the liquid dispenser, and a manually-operated pressure relief mechanism around the check valve. The mechanism comprises a bypass flow passage formed in the housing in parallel with the check valve, and a stopper which normally closes the bypass flow passage. To relieve the liquid pressure, the stopper is manually moved to a relief position where it is removed from the bypass flow passage, thereby enabling the liquid to flow around the check valve. To resume normal operation, the stopper is returned to its normal position where it blocks the bypass flow passage.

BRIEF DESCRIPTION OF THE DRAWINGS

The invention may be better understood from the following detailed description taken in conjunction with the accompanying figures of the drawings, wherein.

DETAILED DESCRIPTION OF THE INVENTION

Figure 1:
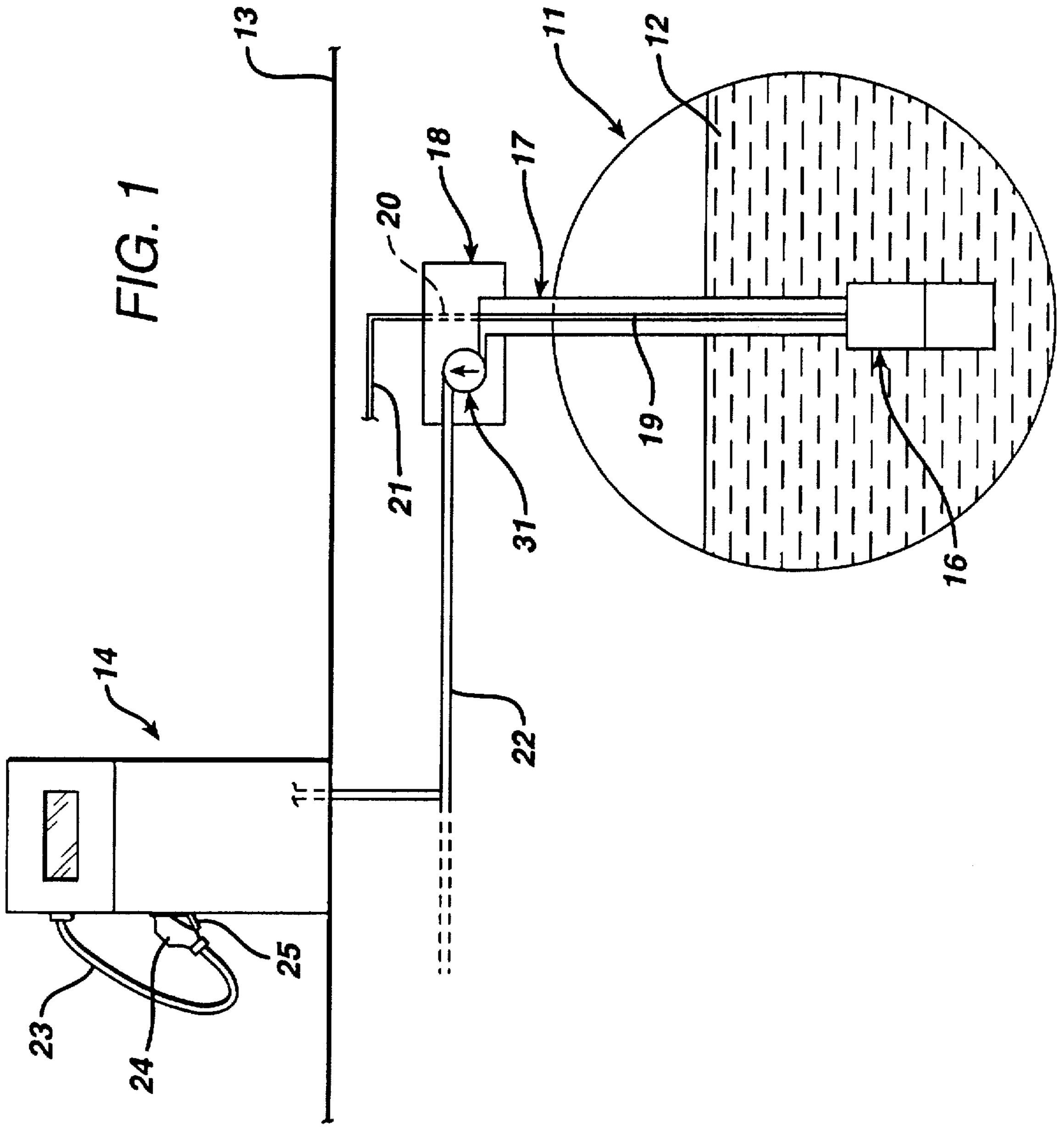
FIG. 1 is a schematic diagram illustrating a pumping system including apparatus constructed in accordance with the present invention.

With reference first to FIG. 1, the numeral 11 indicates a storage tank at least partially filled with a liquid such as fuel 12. While the tank 11 may be located above or below ground level, in the present specific example it is located below ground level which is indicated by the reference numeral 13. Located above ground level 13 are one or more dispensers 14 for the fuel 12, the dispenser 14 having a conventional construction. Suspended within the fuel tank 11 is a pump-motor unit 16 comprising an electric motor coupled to drive a centrifugal or turbine pump. The unit 16 is suspended in the tank 11 by a pipe system 17 including at least one set of pipes which are attached to a manifold 18 and are attached to the pump-motor unit 16. The electric motor of the unit 16 is powered by a power or drop cable 19 which extends through the manifold 18. In this example, the drop cable 19 extends through the pipe system 17 to the unit 16. The drop cable 19, of course, has its upper end 20 connected to receive electrical power from a conventional power supply (not illustrated). The pump-motor unit 16, when turned on, pumps the fuel 12 upwardly through the pipe system 17, through the manifold 18 and dispenser pipes 22 to the dispensers 14. Mounted on each dispenser 14 is a dispenser hose 23 which is connected to receive the fuel from the pipes 22. At the outer end of the hose 23 is a nozzle assembly 24 which includes a hand-operated lever 25. The nozzle assembly 24 includes an internal fuel valve and an electrical switch, and when the hand-operated lever 25 is manually moved, the switch functions to turn on the pump-motor unit 16 and to open the internal valve in the nozzle assembly 24. Fuel is then pumped upwardly by the turbine pump through the pipe system 17 and the dispenser pipes 22, through the dispenser 14 and out of the nozzle assembly 24 to a consumer's fuel tank of, in a typical instance, an automobile.

Figure 2:
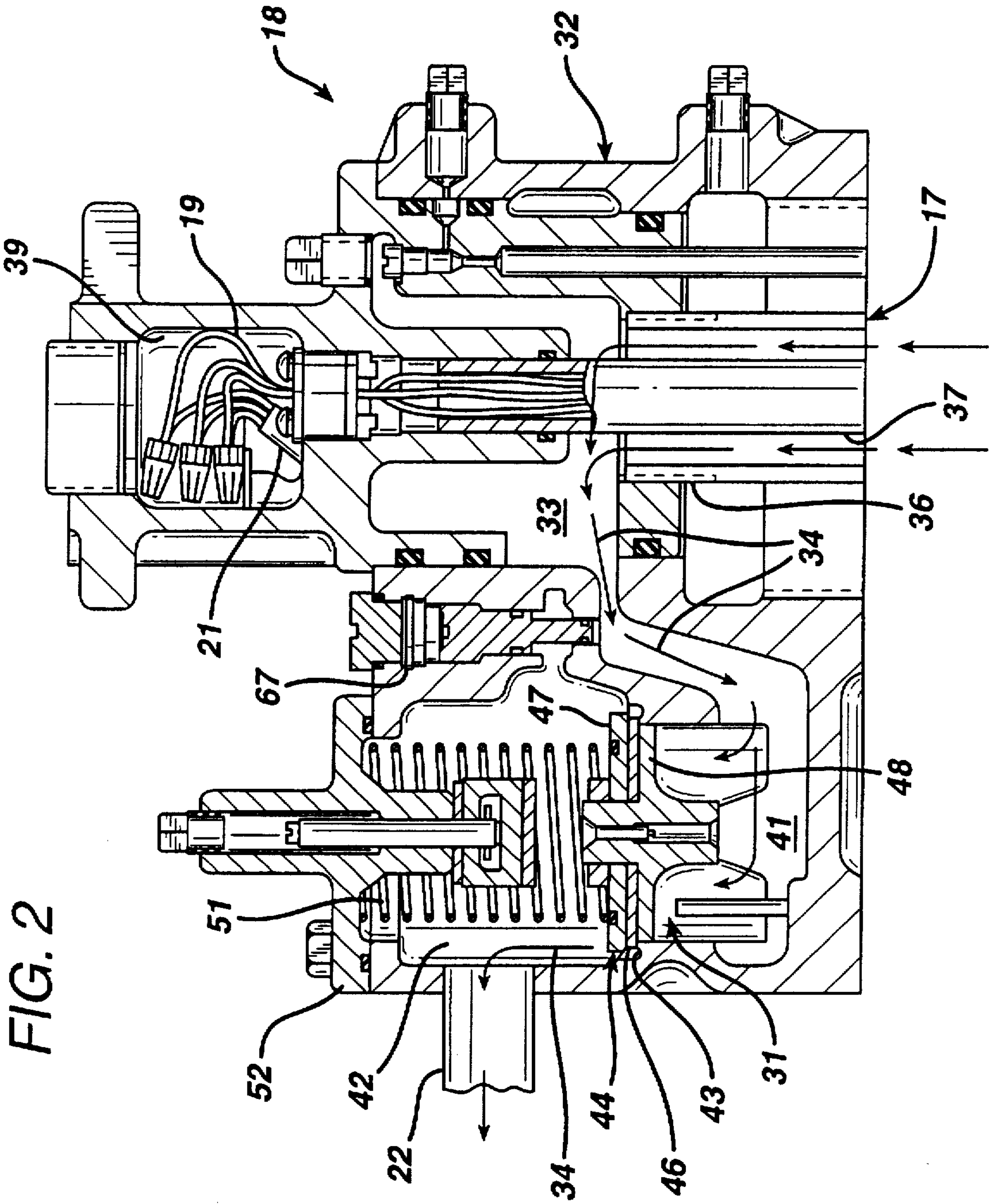
FIG. 2 is a sectional view illustrating the construction of a portion of the pumping system.
Figure 3:
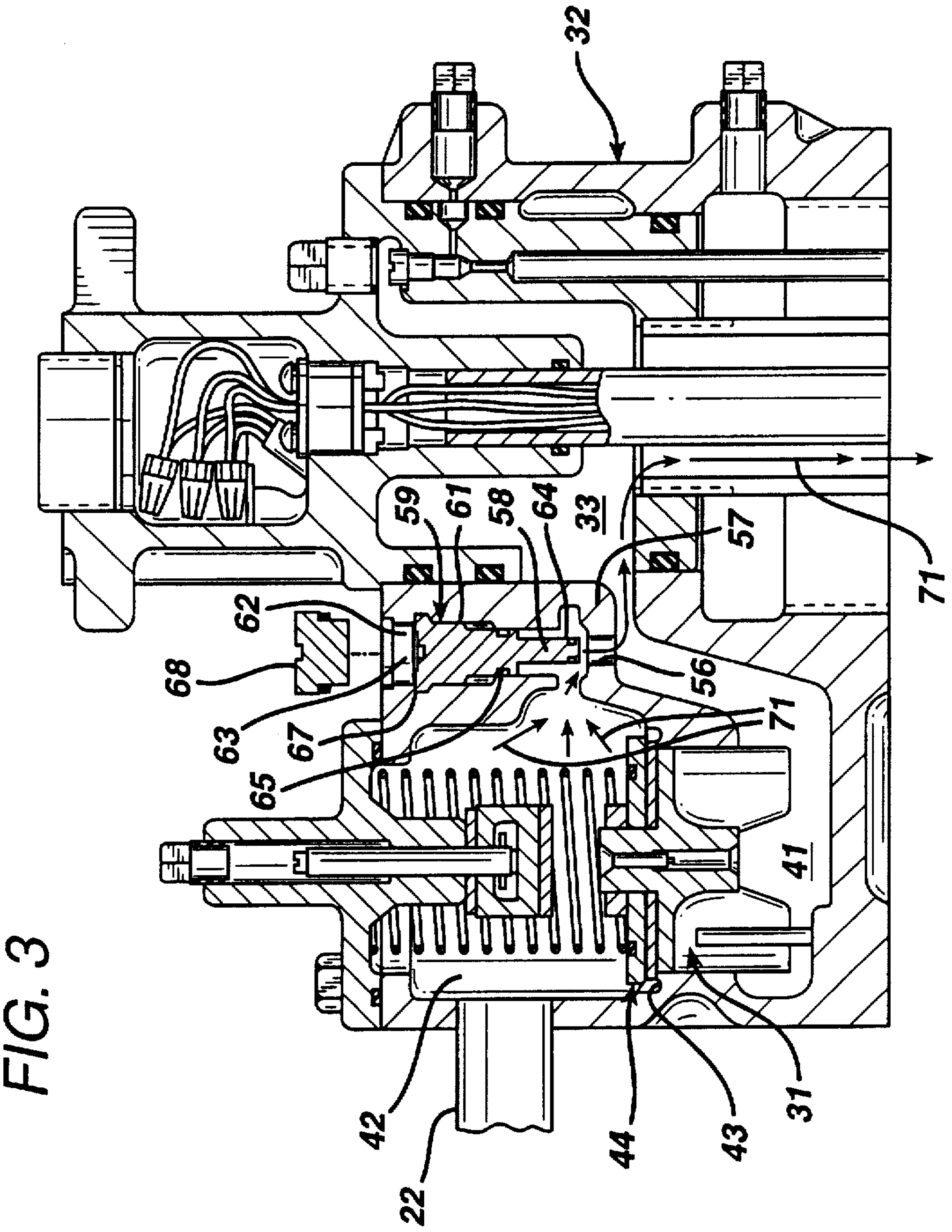
FIG. 3 is a view similar to FIG. 2 but showing different positions of some of the parts.

Mounted within the manifold 18 between the pipe system 17 and the dispenser pipes 22 is a check or one-way valve 31, better illustrated in FIGS. 2 and 3, which allows the fuel to flow only toward the dispenser 14 during normal operation. With specific reference to FIG. 2, the manifold 18 includes a housing 32 which forms both a liquid flow passage and a passage for the drop cable 19. The liquid flow passage is indicated generally by the numeral 33 and the flow of liquid through the housing 32 during normal operation is indicated by the arrows 34. The housing 32 has a threaded coupling 36 with the pipe system 17 and the upper end of the pipe system 17 is in flow communication with the flow passage 33. An electrical conduit 37 extends through the pipe system 17 and the drop cable 19 passes through the conduit 37 and extends between the upper side of the housing 32 and the motor of the unit 16. The interior of the electrical conduit 37 through which the drop cable 19 passes is sealed from the fuel which flows through an annular space 38 between the electrical conduit 37 and the pipe system 17. At the upper end of the housing 32 is a wiring cavity 39 which is sealed from the flow passage 33 and provides space for an electrical connection between the drop cable 19 and a power supply cable 21.

The manifold 18 includes a number of parts which are not described herein in detail and are not given reference numerals in the drawings because such parts may have conventional constructions. Further, the unit 16, the dispenser 14 and the pipes may have conventional constructions.

The check valve 31 is mounted in the fuel flow passage 33 and separates the flow passage 33 into an upstream portion 41 and a downstream portion 42. The upstream portion 41 is in liquid flow communication with the upper end of the pipe system 17 and the downstream portion 42 is in liquid flow communication with the dispenser pipes 22. The check valve 31 includes a valve seat 43 formed in the housing 32 and a valve member 44 which is movable within the flow passage 33 and is engageable with the valve seat 43. The valve member 44 includes a seal part 46 which sandwiched between two relatively rigid members 47 and 48. The seal member 46 has its outer periphery exposed and is engageable with the valve seat 43, and the member 46 is supported by the two members 47 and 48. A compression spring 51 is mounted between the valve member 44 and a part 52 of the housing 32, and the spring 51 engages the part 47 and urges the valve member 44 in the direction of the valve seat 43.

The construction and operation of the check valve 31 may be conventional. When the liquid pressure in the upstream portion 41 of the flow passage 33 overcomes the force of the compression spring 51 plus the pressure in the downstream portion 42, the valve member 44 lifts upwardly off the valve seat 43, thereby allowing fuel to flow from the upstream portion 41 to the downstream portion 42 and to the dispenser pipes 22. This operation occurs when the pump-motor unit 16 is operating and the valve in the dispenser nozzle 24 is opened, thereby creating relatively high fuel pressure in the pipe system 17 and relatively low pressure in the dispenser pipes 22. When the valve in the dispenser nozzle 24 is manually closed (for example, at the end of a dispensing procedure), the fuel pressure in the downstream portion 42 of the flow passage is essentially equalized with the fuel pressure in the upstream portion 41, and the force of the spring 51 moves the valve member 44 onto the valve seat 43. As a consequence, fuel under pressure is trapped in the dispenser pipes 22, the hose 23 and the downstream portion 42 of the flow passage 33, between the dispenser valve and the check valve 44. When the pump-motor unit 16 is turned off and the valve 43 is closed, the fuel in the pipe system 17 and a portion of the fuel in the upstream portion 41 of the main flow passage drain back through the pipe system 17 and the turbine pump. The pressure in the upstream portion 41 drops to the pressure in the storage tank 11 (atmospheric pressure).

At times it is necessary to service the dispenser 14, and the fuel in the dispenser 14 and the pipes 22 should be released before servicing begins. To this end, a by-pass passage is provided between the upstream portion 41 and the downstream portion 42 of the flow passage. With reference to FIG. 3, the by-pass passage is indicated by the reference numeral 56 and it is formed through a wall portion 57 of the housing 32, adjacent the check valve 31. In the present specific example of the invention, the passage 56 comprises a relatively small size, smooth walled passage which is aligned with a stopper pin 58 formed on the lower end of a relief screw 59. The screw 59 has a threaded connection (indicated by the numeral 61) with a bore 62 formed in the housing 32, and the upper end of the screw 59 is accessible from the upper end of the manifold 18 by an open hole 62 formed in the manifold housing 32. A screw slot 63 is formed in the upper end of the relief screw 59 so that the screw 59 may be screwed up or down by inserting a screw driver into the bore 62 and engaging the slot 63. By the turning the screw 59, the screw may be moved upwardly or downwardly between a relief position shown in FIG. 3 where the by-pass passage 56 is open, and a normal position illustrated in FIG. 2 where the by-pass passage is closed by the pin 58. 0-rings 64 and 65 are preferably provided on the shank of the screw 59 and on the lower end of the pin 58, in order to form seals with the manifold housing 32. The 0-ring 65 prevents fuel or vapor from being released into the environment regardless of whether a cap screw 68 is secured in the bore 62.

Further, it is preferred that a split retaining ring 67 be mounted in the bore 62 above the screw 59 to prevent the screw 59 from being entirely removed by accident from the bore. The removable cap screw 68 is preferably provided in the outer end of the bore 62 to cover the screw 59 when pressure relief is not needed.

In summary, assume that the dispenser pipes 22 and the downstream portion 42 of the flow passage 33 are filled with fuel under pressure. Assume further that the turbine pump of the unit 16 is not operating. In these conditions, the fuel under pressure is trapped in the pipes 22 and the passage portion 42, but fuel in the pipe system 17 and in the part of the upstream portion 41 which is above the upper end of the pipe system 17, drains downwardly through the pipe system 17 and the turbine pump into the fuel tank 11.

When it is desired to service the dispenser 14, or for any other reason, the pressure in the dispenser pipe 22 is relieved by first removing the cap screw 68 in order to expose the upper end of the relief screw 59. The screw 59 is, as previously mentioned, in the normal position shown in FIG. 2 where it closes and seals the by-pass passage 56. Using a tool, such as a screw driver, the screw 59 is manually moved upwardly to the position shown in FIG. 3 wherein the pin 58 is moved out of the by-pass passage 56. This allows the fuel within the downstream portion 42 of the flow passage and in the dispenser pipes 22 to drain through the by-pass passage 56 and into the fuel tank 11. The flow of fuel during this relief operation is indicated by the arrows 71 in FIG. 3. While only an amount of fuel needed to relieve the pressure need be drained through the passage 56, it will be noted from FIG. 3 that the by-pass passage 56 is located at a lower level than the by-pass conduit 22 so that the fuel may drain from the dispenser pipes 22 through the passage 56 and into the fuel storage tank 11. Once the fuel has drained from the dispenser pipes 22, the servicing of the dispenser 14 may be completed. To return the system to normal operation, the relief screw 59 is returned to the normal position shown in FIG. 2 where the 0-ring 65 seals the by-pass passage 56. The cap 68 is then mounted in the upper end of the hole 62 and the system is then ready once again for normal operation.

It will be apparent from the foregoing that an improved liquid supply system has been provided. The system may be manually adjusted for normal operation wherein it delivers fuel under pressure to the dispensers, or it may be easily manually adjusted to relieve the pressure and drain the dispenser pipes. Since the fuel is returned to the tank 11, no fuel is lost or released into the environment.

What is claimed is:

1. In a liquid pumping system including a source of liquid under pressure, a plurality of liquid dispensers, each including a dispenser valve, and pipes for conveying the liquid from the source to the dispensers, the improvement comprising a manifold housing having a liquid flow passage formed therein, said passage having an upstream portion for connection to a first pipe leading to said source and a downstream portion for connection to a second pipe leading to said dispensers, a check valve mounted in said flow passage between said downstream portion and said upstream portion, said check valve allowing flow only from said upstream portion to said downstream portion, said manifold housing further having a bypass passage formed therein, said bypass passage being in parallel with said check valve and connecting said downstream portion with said upstream portion, and a manually operable stopper movably mounted in an exterior wall portion of said housing and movable between a normal position and a relief position, said stopper extending into and sealing said bypass passage when in said normal position and said stopper being withdrawn from and opening said bypass passage when in said relief position.

2. Apparatus as set forth in claim 1, wherein said manifold housing has a bore formed therein, said stopper being movably mounted in said bore, and said bore having an opening at the exterior of said housing, whereby said stopper is accessible through said opening and said bore.

3. Apparatus as set forth in claim 2, wherein said stopper is threadedly mounted in said bore, and said stopper includes means engageable by a tool for manually turning said stopper.

4. Apparatus as set forth in claim 2, and further including a cap removably mounted in said opening of said bore.

5. Apparatus as set forth in claim 2, and further including seal means for sealing said bore between said opening and said bypass passage.

6. Apparatus as set forth in claim 1, wherein said stopper is manually movable in said bore between said normal and relief positions.

7. Apparatus as set forth in claim 1, wherein said bypass passage is at a lower level than said downstream portion for connection to said second pipe and is at a higher level than said upstream portion for connection to said first pipe.

8. A liquid pumping system comprising a source of liquid under pressure, a plurality of liquid dispensers, each including a dispenser valve, pipes for conveying the liquid from said source to said dispensers, a manifold housing having a liquid flow passage formed therein, said passage having an upstream portion for connection to a first pipe leading to said source and a downstream portion for connection to a second pipe leading to said dispensers, a check valve mounted in said flow passage between said downstream portion and said upstream portion, said check valve allowing flow only from said upstream portion to said downstream portion, said manifold housing further having a bypass passage formed therein, said bypass passage being in parallel with said check valve and connecting said downstream portion with said upstream portion, and a manually operable stopper movably mounted in an exterior wall portion of said housing and movable between a normal position and a relief position, said stopper extending into and sealing said bypass passage when in said normal position and said stopper being withdrawn from and opening said bypass passage when in said relief position.

9. Apparatus as set forth in claim 8, wherein said manifold housing has a bore formed therein, said stopper being movably mounted in said bore, and said bore having an opening at the exterior of said housing, whereby said stopper is accessible through said opening and said bore.

10. Apparatus as set forth in claim 8, and further including seal means for sealing said bore between said opening and said bypass passage.

11. Apparatus as set forth in claim 9, wherein said stopper is threadedly mounted in said bore, and said stopper includes means engageable by a tool for manually turning said stopper.

12. Apparatus as set forth in claim 10, and further including a cap removably mounted in said opening of said bore.

13. Apparatus as set forth in claim 8, wherein said stopper is manually movable in said bore between said normal and relief positions.

14. Apparatus as set forth in claim 8, wherein said bypass passage is at a lower level than said downstream portion for connection to said second pipe and is at a higher level than said upstream portion for connection to said first pipe.

15. A fuel pumping system comprising a turbine pump for pumping fuel under pressure, a plurality of fuel dispensers, each including a dispenser valve, and pipes for conveying the fuel from said pump to said dispensers, a manifold housing having a fuel flow passage formed therein, said passage having an upstream portion for connection to a first pipe leading to said pump and a downstream portion for connection to a second pipe leading to said dispensers, a check valve mounted in said flow passage between said downstream portion and said upstream portion, said check valve allowing flow only from said upstream portion to said downstream portion, said manifold housing further having a bypass passage formed therein, said bypass passage being in parallel with said check valve and connecting said downstream portion with said upstream portion, and a manually operable stopper movably mounted in an exterior wall portion of said housing and movable between a normal position and a relief position, said stopper extending into and sealing said bypass passage when in said normal position and said stopper being withdrawn from and opening said bypass passage when in said relief position.

16. Apparatus as set forth in claim 15, wherein said manifold housing has a bore formed therein, said stopper being movably mounted in said bore, and said bore having an opening at the exterior of said housing, whereby said stopper is accessible through said opening and said bore.

17. Apparatus as set forth in claim 16, and further including seal means for sealing said bore between said opening and said bypass passage.

18. Apparatus as set forth in claim 16, wherein said stopper is threadedly mounted in said bore, and said stopper includes means engageable by a tool for manually turning said stopper.

19. Apparatus as set forth in claim 16, and further including a cap removably mounted in said opening of said bore.

20. Apparatus as set forth in claim 15, wherein said stopper is manually movable in said bore between said normal and relief positions.

21. Apparatus as set forth in claim 15, wherein said bypass passage is at a lower level than said downstream portion for connection to said second pipe and is at a higher level than said upstream portion for connection to said first pipe.

* * * * *